US012759049B2

(12) United States Patent
Peach et al.

(10) Patent No.: US 12,759,049 B2
(45) Date of Patent: Oct. 13, 2026

(54) FUME EXTRACTOR SYSTEM AND METHODS

(71) Applicant: Donaldson Company, Inc., Bloomington, MN (US)

(72) Inventors: Aaron S. Peach, Weymouth (GB); Ross C. J. Stoneham, Ferndown (GB)

(73) Assignee: Donaldson Company, Inc., Bloomington, MN (US)

( * ) Notice: Subject to any disclaimer, the term of this patent is extended or adjusted under 35 U.S.C. 154(b) by 759 days.

(21) Appl. No.: 17/903,314

(22) Filed: Sep. 6, 2022

(65) Prior Publication Data

US 2023/0074507 A1 Mar. 9, 2023

Related U.S. Application Data

(60) Provisional application No. 63/241,409, filed on Sep. 7, 2021.

(51) Int. Cl.
*B22F 10/32* (2021.01)
*B01D 39/20* (2006.01)
(Continued)

(52) U.S. Cl.
CPC .......... *B22F 10/32* (2021.01); *B01D 39/2017* (2013.01); *B01D 46/0036* (2013.01); (Continued)

(58) Field of Classification Search
CPC ............ B01D 46/0036; B01D 39/2017; B01D 46/0049; B01D 46/4272; B01D 46/521; (Continued)

(56) References Cited

U.S. PATENT DOCUMENTS 4,563,943 A * 1/1986 Bertelsen ................ B08B 15/02 454/67
5,951,725 A * 9/1999 Vross ..................... B01D 46/00 55/357
(Continued)

FOREIGN PATENT DOCUMENTS

CA 2738618 C 12/2017
CN 204471887 U 7/2015
(Continued)

OTHER PUBLICATIONS

International Search Report and Written Opinion from PCT/US2022/075982 mailed Feb. 16, 2023, 20 pages.
(Continued)

*Primary Examiner* — In Suk C Bullock
(74) *Attorney, Agent, or Firm* — Merchant & Gould P.C.

(57) ABSTRACT

A fume extractor system and method for use with a 3D printer includes a system operable in three conditions including: continuously filtering particulates and fumes at high temperatures during a printing process without intentional removal of pressure from the print chamber; continuously filtering particulates at high temperatures during a print process with intentional removal of pressure from the print chamber, to keep noxious gases retained in the print chamber; and purging the print chamber of fumes and mixing in ambient air to cool the fumes to a temperature low enough to allow adsorption of the fumes created by the printer. The system has a first compartment holding a first filter assembly and a second compartment holding a second filter assembly.

10 Claims, 3 Drawing Sheets

(51) Int. Cl.

| | |
|---|---|
| ***B01D 46/00*** | (2022.01) |
| ***B01D 46/42*** | (2006.01) |
| ***B01D 46/52*** | (2006.01) |
| ***B01D 46/56*** | (2022.01) |
| ***B01D 53/02*** | (2006.01) |
| ***B29C 64/364*** | (2017.01) |
| ***B33Y 40/00*** | (2020.01) |

(52) U.S. Cl.
CPC ..... *B01D 46/0049* (2013.01); *B01D 46/4272* (2013.01); *B01D 46/521* (2013.01); *B01D 46/56* (2022.01); *B01D 53/02* (2013.01); *B29C 64/364* (2017.08); *B33Y 40/00* (2014.12); *B01D 2253/102* (2013.01); *B01D 2279/45* (2013.01)

(58) Field of Classification Search
CPC .. B01D 46/56; B01D 53/02; B01D 2253/102; B01D 2279/45; B29C 64/364; B33Y 40/00; B08B 15/04
See application file for complete search history.

(56) References Cited

U.S. PATENT DOCUMENTS

| | | | | |
|---|---|---|---|---|
| 7,008,206 B2 | | 3/2006 | Fong et al. | |
| 8,794,263 B2 | | 8/2014 | Scott et al. | |
| 10,974,184 B2 | | 4/2021 | Scott et al. | |
| 2020/0254523 A1 | | 8/2020 | Beauchamp et al. | |
| 2022/0379256 A1 | * | 12/2022 | Mansell | B22F 3/003 |
| 2023/0264263 A1 | * | 8/2023 | Kleinhans | B22F 10/28 419/1 |

FOREIGN PATENT DOCUMENTS

| | | | | | |
|---|---|---|---|---|---|
| CN | 205127649 U | | 4/2016 | | |
| CN | 205659505 U | | 10/2016 | | |
| CN | 107469504 A | | 12/2017 | | |
| CN | 213056022 U | | 4/2021 | | |
| DE | 2401426 A1 | | 7/1975 | | |
| DE | 202012013036 U1 | | 9/2014 | | |
| DE | 202020104146 U1 | | 9/2020 | | |
| EP | 2331232 B1 | | 4/2014 | | |
| EP | 3321007 A1 | | 5/2018 | | |
| EP | 3431258 A1 | | 1/2019 | | |
| KR | 102238328 B1 | * | 4/2021 | B22F 3/105 | |
| NL | 2021323 B1 | | 1/2020 | | |
| WO | 2020023032 A1 | | 1/2020 | | |
| WO | 2021254783 A1 | | 12/2021 | | |

OTHER PUBLICATIONS

Invitation to Pay Additional Fees for PCT/US2022/075982 mailed Dec. 19, 2022, 14pgs.

* cited by examiner

FUME EXTRACTOR SYSTEM AND METHODS

This application claims priority to U.S. provisional patent application 63/241,409 filed Sep. 7, 2021, incorporated herein by reference in its entirety.

TECHNICAL FIELD

This disclosure relates generally to a fume extractor for high temperature 3D printing applications, and methods of filtering and use.

BACKGROUND

To access a greater variety of materials for 3D printing, higher processing temperatures need to be used. These higher temperatures, however, lead to an increase in noxious fumes. Currently no solution for the removal of these fumes at high temperatures exists. The fumes are dangerous to the user of the 3D printers, but also removing all the air inside the chamber removes heat which is costly to replace in high amounts. Temperature fluctuations also impact part quality.

Solutions to this problem are desirable.

SUMMARY

In general, this disclosure is directed to a container that is an improvement over the prior art.

In one aspect, a fume extractor system for use with a 3D printer is provided. The system comprises: a first compartment holding a first filter assembly; a first pump moving gas through the first filter assembly; a first conduit conveying gas from a chamber holding a 3D printer to the first filter compartment; and a second conduit conveying gas into the chamber holding the 3D printer.

Many examples further include a fresh air valve connected to the second conduit being openable and closeable to ambient air.

Example systems further include a second compartment holding a second filter assembly; and a second pump moving gas through the second filter assembly.

In one or more embodiments, at least one of the first filter assembly and second filter assembly includes an adsorption filter for removing noxious fumes.

In preferred systems, each of the first filter assembly and second filter assembly includes filtration of particulates from gas.

In many example embodiments, the first conduit has a first branch to the first filter compartment, and a second branch to the second filter compartment.

Example systems include a first one way valve between the first branch and first filter compartment; and a second one way valve between the second branch and second filter compartment.

In some examples, each of the first filter assembly and second filter assembly includes pleated filter media of glass fiber.

Many example systems further include an openable and closeable vent in the first compartment in communication with a local environment.

Some embodiments may further include the chamber holding the 3D printer.

In another aspect, a method of operating a fume extractor system for use with a 3D printer in a print chamber is provided. The method comprises operating the system in three conditions, the conditions including: (a) continuously filtering particulates at high temperatures during a printing process without intentional removal of pressure from the print chamber; and (b) continuously filtering particulates at high temperatures during a print process with intentional removal of pressure from the print chamber, to keep noxious gases retained in the print chamber; and (c) purging the print chamber of fumes and mixing in ambient air to cool the fumes to a temperature low enough to allow adsorption of the fumes created by the printer.

In some methods, the high temperatures include temperatures greater than 50° C.

For some example methods, the step of allowing adsorption includes allowing activated carbon to adsorb the fumes created by the printer.

Preferred methods use a system as variously characterized above.

A variety of examples of desirable features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

In general, example embodiments solve the problems in the prior art by one or more combinations of: using a modular design with pump(s) and a control system to enable multi-function managing of fumes, throughout the various stages of the printing process; enabling adjustment of flows and heat depending on the ultimate application; and/or keeping temperatures substantially constant—to maintain high quality.

Figure 1:
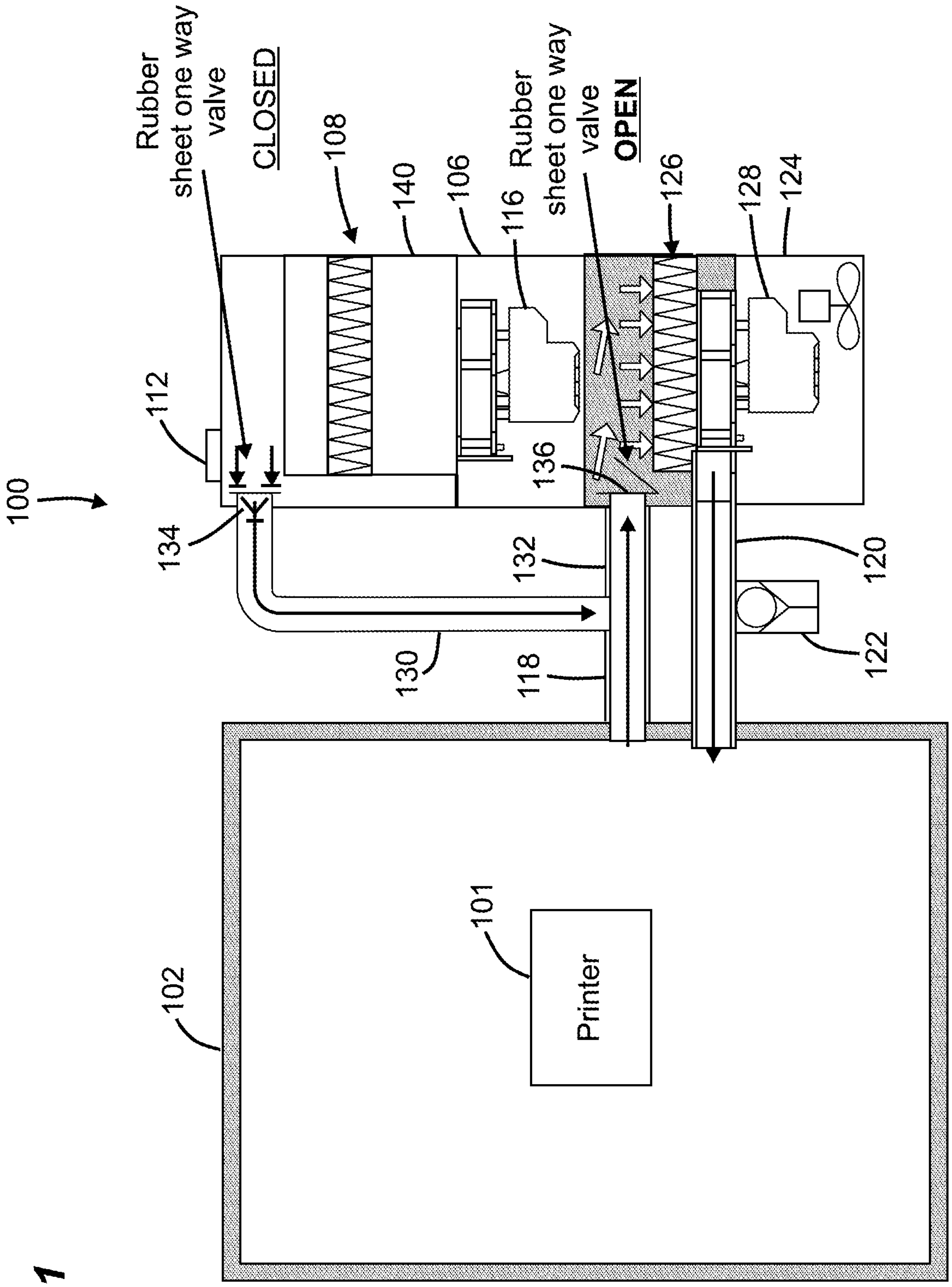
FIG. 1 is a schematic diagram of an embodiment of a system made in accordance with principles of this disclosure, the system being shown in a first operating condition.
Figure 2:
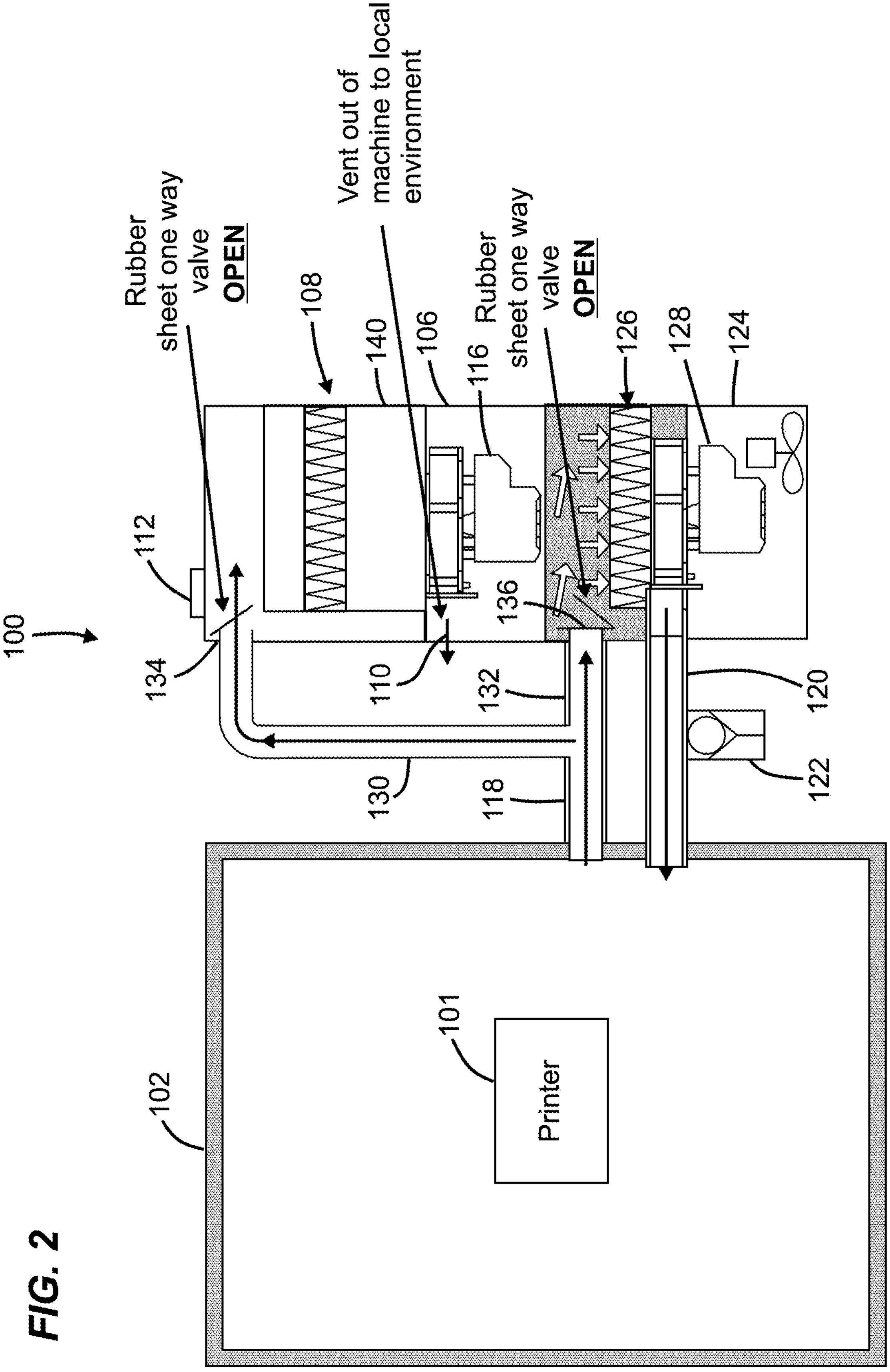
FIG. 2 is a schematic diagram of an embodiment of the system of FIG. 1, the system being shown in a second operating condition.
Figure 3:
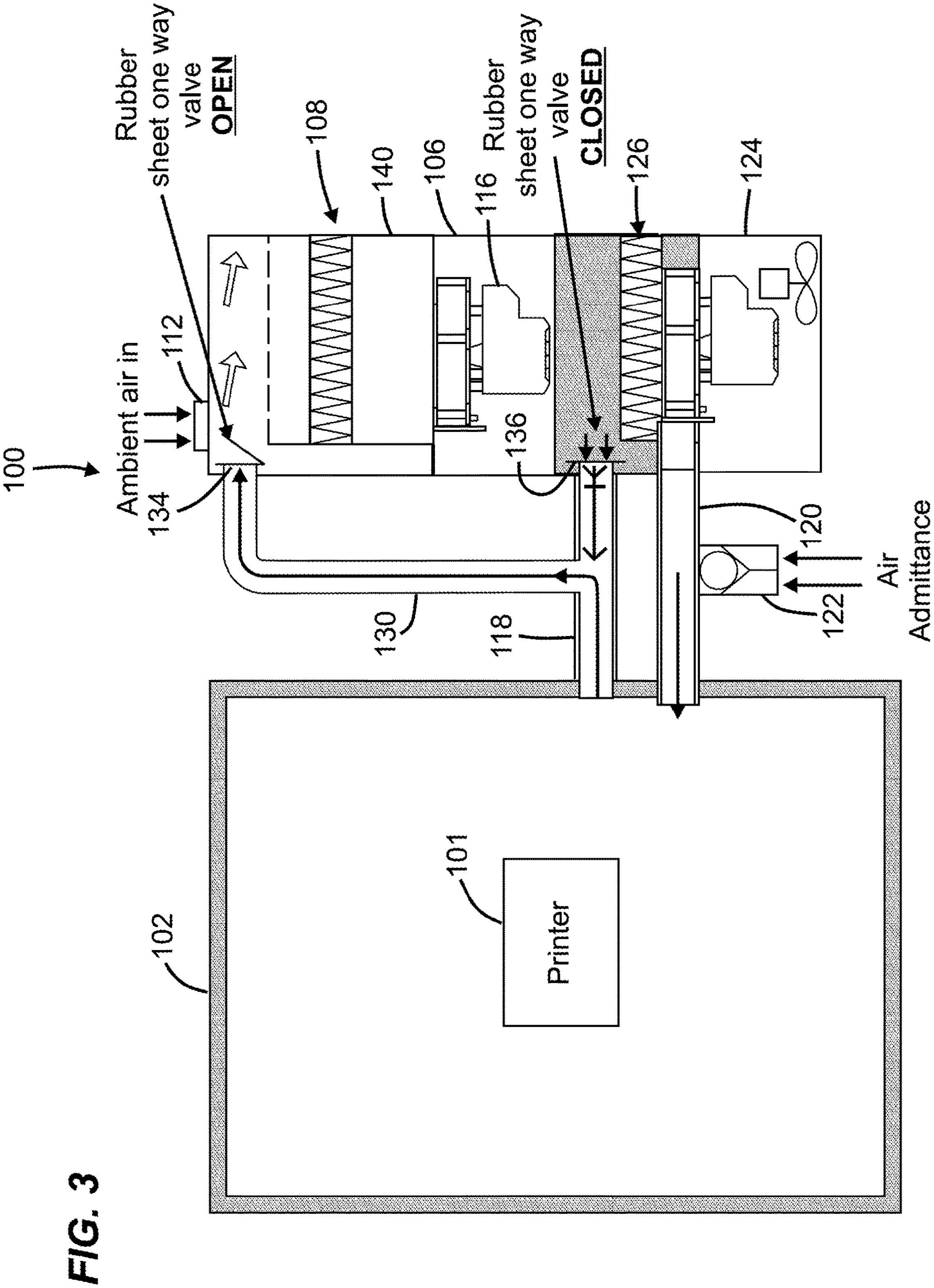
FIG. 3 is a schematic diagram of an embodiment of the system of FIG. 1, the system being shown in a third operating condition.

In reference now to the schematic diagrams of FIGS. 1-3, a system 100 is shown. The system 100 can be portable, in that it can be easily set up/taken down/and moved to locations as needed. The system 100 is for use with a 3D printer 101. The 3D printer 101 can be any of conventional 3D printers commercially available. The printer 101 can be held or housed within a housing or chamber 102.

The system 100 is particularly useful for extracting fumes, including noxious fumes. When various materials are used for the 3D printer 101, higher processing temperatures are used, which leads to an increase in noxious fumes. Removing all the fumes and/or air inside of the chamber 102 removes heat, which is costly to replace in high amounts. Temperature fluctuations also impact part quality. The system 100 can extract fumes, while maintaining the heat within the chamber 102.

The system 100 includes a first compartment 106. The first compartment 106 houses or holds a first filter assembly 108. The first filter assembly 108 includes filtration of particulates from gas, and can be embodied in many different configurations. For example, the first filter assembly 108 may be pleated filter media made from glass fiber.

The first compartment 106 includes a vent 110 in communication with the local (ambient) environment. The vent 110 is selectively openable and closeable, and when it is opened or closed is described further below. The first compartment 106 also includes an ambient air inlet 112, whose use is described further below.

The system 100 includes at least a first pump 116. The first pump 116 moves gas (air) through the first filter assembly 108. Instead of a pump, a fan could be used as well.

The system 100 further includes a first conduit 118. The first conduit 118 is positioned to convey gas (including any fumes and particulate matter) from the chamber 102 to the first filter compartment 106.

The system 100 further includes a second conduit 120. The second conduit 120 is positioned to convey gas into the chamber 102 holding the 3D printer 101.

A fresh air valve 122 is connected (in communication with) the second conduit 120 and is openable and closeable to ambient air.

The system 100 further includes a second compartment 124. The second compartment 124 holds a second filter assembly 126. The second filter assembly 126 includes filtration of particulates from gas, and can be embodied in many different configurations. For example, the second filter assembly 126 may be pleated filter media made from glass fiber.

The system 100 includes a second pump 128. The second pump 128 moves gas (air) through the second filter assembly 126. Instead of a pump, a fan could be used as well.

In this embodiment, the first conduit 118 has a first branch 130 to the first filter compartment 106, and a second branch 132 to the second filter compartment 124.

The system 100 includes valve arrangements to help direct and control the flow. In this example, there is a first one way valve 134 between the first branch 130 and first filter compartment 106. A second one way valve 136 is positioned between the second branch 132 and second filter compartment 124.

In preferred systems, at least one of the first filter assembly 108 and second filter assembly 126 includes an adsorption filter 140 for removing noxious fumes. In the example shown, the adsorption filter 140 is part of the first filter assembly 108. The adsorption filter 140 can include any of a variety of adsorption members, selected for removing the specific noxious fumes generated in the 3D printing process. For example, activated carbon can be used for the adsorption filter 140.

In operation, the system 100 can be used in a method of operating for use with 3D printer 101 in print chamber 102. The method includes operating the system in three conditions.

In a first condition, as shown in FIG. 1, the method continuously filters particulates at high temperatures during a printing process without intentional removal of pressure from the print chamber 102. Air is directed from the chamber 102 into the first conduit 118 and into the second chamber 124. The second valve 136 is open, and the first valve 134 is closed. The second pump 128 draws air from the chamber 102 and through the second filter assembly 126. The filtered air is then returned to the chamber 102 through the second conduit 120.

In a second condition, as shown in FIG. 2, the method includes continuously filtering particulates at high temperatures during a print process with intentional removal of pressure from the print chamber 102, to keep noxious gases retained in the print chamber 102. The high temperatures can include temperatures greater than 50° C., including up to 130° C., and in some instances, up to 250° C. In the second condition, both valves 134, 136 are open, and the first pump 116 draws air from the chamber 102 through the first filter assembly 108, which includes the adsorption filter 140. The adsorption filter 140 may use activated carbon to adsorb the fumes created by the printing process. The vent 110 is open to release the air, purified of the fumes, into the ambient environment. The air is also filtered by the second pump 128 drawing air through the second filter assembly 126, and then returning the filtered air to the chamber 102 through the second conduit 120.

In the third condition, shown in FIG. 3, the method includes purging the print chamber 102 of fumes and mixing in ambient air to cool the fumes to a temperature low enough to allow adsorption of the fumes created by the printer. The fresh air valve 122 is open, allowing the flow of fresh air into the second conduit 120, permitting the flow of fresh air into the chamber 102. The air inlet 112 into the first compartment 106 is open, allowing the flow of ambient air into the first compartment. Valve 134 is open, and valve 136 is closed, drawing air through the first filter assembly 108. The adsorption filter 140 adsorb the fumes created by the printing process, while the vent 110 is open to release the air, purified of the fumes, into the ambient environment.

Preferred methods use the system and components as described above.

Aspects

Aspect 1. A fume extractor system for use with a 3D printer; the system comprising: (a) a first compartment holding a first filter assembly; (b) a first pump moving gas through the first filter assembly; (c) a first conduit conveying gas from a chamber holding a 3D printer to the first filter compartment; and (d) a second conduit conveying gas into the chamber holding the 3D printer.

Aspect 2. The system of aspect 1 further including a fresh air valve connected to the second conduit being openable and closeable to ambient air.

Aspect 3. The system of any one of aspects 1 and 2 further including: (a) a second compartment holding a second filter assembly; and (b) a second pump moving gas through the second filter assembly.

Aspect 4. The system of aspect 3 wherein at least one of the first filter assembly and second filter assembly includes an adsorption filter for removing noxious fumes.

Aspect 5. The system of any one of aspects 3 and 4 wherein each of the first filter assembly and second filter assembly includes filtration of particulates from gas.

Aspect 6. The system of any one of aspects 3-5 wherein the first conduit has a first branch to the first filter compartment, and a second branch to the second filter compartment.

Aspect 7. The system of aspect 6 further including: (a) a first one way valve between the first branch and first filter compartment; and (b) a second one way valve between the second branch and second filter compartment.

Aspect 8. The system of any one of aspects 3-7 each of the first filter assembly and second filter assembly includes pleated filter media of glass fiber.

Aspect 9. The system of any one of aspects 1-8 further including an openable and closeable vent in the first compartment in communication with a local environment.

Aspect 10. The system of any one of aspects 1-9 further including the chamber holding the 3D printer.

Aspect 11. The system of any one of the preceding aspects, in combination with any other aspect, or any portion of the drawings.

Aspect 12. A method of operating a fume extractor system for use with a 3D printer in a print chamber; the method comprising: operating the system in three conditions, the conditions including, (a) continuously filtering particulates at high temperatures during a printing process without intentional removal of pressure from the print chamber; and (b) continuously filtering particulates at high temperatures during a print process with intentional removal of pressure from the print chamber, to keep noxious gases retained in the print chamber; and (c) purging the print chamber of fumes and mixing in ambient air to cool the fumes to a temperature low enough to allow adsorption of the fumes created by the printer.

Aspect 13. The method of aspect 12 wherein the high temperatures include temperatures greater than 50° C.

Aspect 14. The method of any one of aspects 12 and 13 wherein the step of allowing adsorption includes allowing activated carbon to adsorb the fumes created by the printer.

Aspect 15. The method of any one of aspects 12-14 using a system of any one of aspects 3-7 or any other aspect above.

The above represents example principles. Many embodiments can be made using these principles.

What is claimed is:

1. A fume extractor system for use with a 3D printer; the system comprising:

(a) a first compartment holding a first filter assembly;

(b) a first pump moving gas through the first filter assembly;

(c) a first conduit conveying gas from a chamber holding a 3D printer to the first filter compartment;

(d) a second conduit conveying gas into the chamber holding the 3D printer;

(e) a second compartment holding a second filter assembly; and (f) a second pump moving gas through the second filter assembly;

wherein at least one of the first filter assembly and second filter assembly includes an adsorption filter for removing noxious fumes.

2. The system of claim 1 further including a fresh air valve connected to the second conduit being openable and closeable to ambient air.

3. The system of claim 1 wherein each of the first filter assembly and second filter assembly includes filtration of particulates from gas.

4. The system of claim 1 wherein the first conduit has a first branch to the first filter compartment, and a second branch to the second filter compartment.

5. The system of claim 4 further including:

(a) a first one way valve between the first branch and first filter compartment; and (b) a second one way valve between the second branch and second filter compartment.

6. The system of claim 3 wherein the first conduit has a first branch to the first filter compartment, and a second branch to the second filter compartment.

7. The system of claim 1 wherein each of the first filter assembly and second filter assembly includes pleated filter media of glass fiber.

8. The system of claim 1 further including an openable and closeable vent in the first compartment in communication with a local environment.

9. The system of claim 5 further including an openable and closeable vent in the first compartment in communication with a local environment.

10. The system of claim 1 further including the chamber holding the 3D printer.

* * * * *